United States Patent
Carmi

(10) Patent No.: US 9,959,594 B2
(45) Date of Patent: May 1, 2018

(54) FUSION OF MULTIPLE IMAGES

(75) Inventor: Raz Carmi, Haifa (IL)

(73) Assignee: KONINKLIJKE PHILIPS N.V., Eindhoven (NL)

(*) Notice: Subject to any disclaimer, the term of this patent is extended or adjusted under 35 U.S.C. 154(b) by 305 days.

(21) Appl. No.: 13/810,454

(22) PCT Filed: Jul. 14, 2011

(86) PCT No.: PCT/IB2011/053145
§ 371 (c)(1),
(2), (4) Date: Jan. 16, 2013

(87) PCT Pub. No.: WO2012/011028
PCT Pub. Date: Jan. 26, 2012

(65) Prior Publication Data
US 2013/0120453 A1  May 16, 2013

Related U.S. Application Data

(60) Provisional application No. 61/366,686, filed on Jul. 22, 2010.

(51) Int. Cl.
*G06T 3/00* (2006.01)
*G06T 5/50* (2006.01)
*H04N 1/387* (2006.01)

(52) U.S. Cl.
CPC .......... *G06T 3/00* (2013.01); *G06T 5/50* (2013.01); *H04N 1/3871* (2013.01);
(Continued)

(58) Field of Classification Search
USPC ........................................ 345/634
See application file for complete search history.

(56) References Cited

U.S. PATENT DOCUMENTS 5,771,033 A * 6/1998 Katzenberger .......... G06T 11/00
345/600
5,805,163 A * 9/1998 Bagnas .................. G06F 3/0481
715/768

(Continued)

FOREIGN PATENT DOCUMENTS

EP      1210910 A1    6/2002
JP      59183459 A   10/1984

(Continued)

OTHER PUBLICATIONS

American Cancer Society: Imaging (Radiology) Tests: Computed Tomography Scan appearing on Oct. 26, 2010, at:http://web.archive.org/web/20101026174515/http://www.cancer.org/Treatment/UnderstandingYour Diagnosis/ExamsandTestDescriptions/ImagingRadiologyTests/imaging-radiology-tests-ct.*

(Continued)

*Primary Examiner* — Kumar Patel
*Assistant Examiner* — Richard M Russell

(57) ABSTRACT

A method includes fusing at least three images together into a single fused image, wherein at least one of the three images includes a binary-pattern representation image. A system includes an image processing system (100) that combines an anatomical image, a functional image and a binary-pattern representation image into a single image. A computer readable storage medium encoded with computer executable instructions, which, when executed by a processor of a computer, cause the processor to combine an anatomical image, a functional image, and a binary-pattern representation of a different functional image into a single image such that the anatomical image and the functional image are visible in interspaces between binary points of the binary-pattern representation of the functional image.

19 Claims, 2 Drawing Sheets

(52) U.S. Cl.
CPC ............... *G06T 2207/10081* (2013.01); *G06T 2207/10096* (2013.01); *G06T 2207/20221* (2013.01)

(56) References Cited

U.S. PATENT DOCUMENTS

| | | | |
|---|---|---|---|
| 5,954,650 | A * | 9/1999 | Saito .................. G06T 11/00 382/128 |
| 6,807,247 | B2 | 10/2004 | Krishnan et al. |
| 7,012,616 | B1 | 3/2006 | Chatterjee |
| 7,439,974 | B2 | 10/2008 | Chihoub et al. |
| 7,532,770 | B2 | 5/2009 | Pfister |
| 8,032,202 | B2 | 10/2011 | Omi et al. |
| 8,472,684 | B1 * | 6/2013 | Periaswamy ........ G06K 9/6289 382/128 |
| 2003/0113005 | A1 | 6/2003 | Saxena et al. |
| 2005/0041036 | A1 | 2/2005 | Narayanaswami et al. |
| 2006/0184014 | A1 * | 8/2006 | Pfeiler .......................... 600/426 |
| 2006/0215889 | A1 * | 9/2006 | Omi .................... A61B 6/032 382/128 |
| 2007/0098299 | A1 | 5/2007 | Matsumoto |
| 2008/0008366 | A1 | 1/2008 | Desh et al. |
| 2008/0008401 | A1 | 1/2008 | Zhu et al. |
| 2008/0024683 | A1 | 1/2008 | Damera-Venkata et al. |
| 2008/0118182 | A1 * | 5/2008 | Koole ........................... 382/284 |
| 2009/0237740 | A1 * | 9/2009 | Kasahara ............. G06K 15/027 358/3.27 |
| 2009/0262260 | A1 | 10/2009 | Jaynes et al. |
| 2010/0322488 | A1 * | 12/2010 | Virtue et al. .................. 382/128 |
| 2011/0227910 | A1 * | 9/2011 | Ying ...................... A61B 6/032 345/419 |

FOREIGN PATENT DOCUMENTS

| | | |
|---|---|---|
| JP | 2004005285 A | 1/2004 |
| JP | 2005192657 A | 7/2005 |
| JP | 2007114294 A | 5/2007 |
| WO | 2004063993 A1 | 7/2004 |

OTHER PUBLICATIONS

Nakajo et al., "Three-Dimensional Registration of Myocardial Perfusion SPECT and CT Coronary Angiography." Annals of Nuclear Medicine 19.3 (2005): 207-215.*
Aitken et al., Comparison of Three Methods Used for Fusion of SPECT-CT Images of Liver Metastases. Fusion98, International Conference on Multisource-Mulltisensor Information Fusion, CSREA Press, 1998, p. 435.*
Web Style Guide: Dithering as appearing on Nov. 5, 2009, at http://web.archive.org/web/20091105031757/http://webstyleguide.com/wsg2/graphics/dither.html.*
http://www.merriam-webster.com/dictionary/pattern.*
Wikipedia, Raster Scan, as appearing on Jun. 22, 2010, and available at https://en.wikipedia.org/w/index.php?title=Raster_scan&oldid=369519922.*
Fischer, J., et al.; Illustrative Display of Hidden Iso-Surface Structures; 2005; IEEE Visualization; pp. 663-670.

* cited by examiner

FUSION OF MULTIPLE IMAGES

CROSS REFERENCE TO RELATED APPLICATIONS

This application is a national filing of PCT application Serial No. PCT/IB2011/053145, filed Jul. 14, 2011, published as WO 2012/011028 A1 on Jan. 26, 2012, which claims the benefit of U.S. provisional application Ser. No. 61/366,686 filed Jul. 22, 2010, which is incorporated herein by reference.

The following generally relates to fusing images and is described with particular application to fusing three or more (structural and functional) different images into a single fused image. However, the following is also amenable to fusing two images and to visualizing an individual image.

Images from two different imaging modalities have been co-registered (or fused) to form a single image. Generally, one of the modalities provides functional-oriented information and the other of the modalities provides anatomical-oriented information. The fused image has been created by representing the anatomical information with a semi-transparent grayscale and the functional information with a semi-transparent color-scheme, which is overlaid or blended with the anatomical information. Displaying the fused image has several advantages over showing only the different images side by side, especially in perceiving the mutual relations between different clinical information types.

With some applications, more than one type of functional information is captured. An example is an imaging protocol which includes, besides the conventional anatomical-functional information, additional sequences such as perfusion studies, dual-tracer administration, dual-energy CT, functional MRI and more. These additional sequences have provided images with complementary information on the imaged subject. With these applications, the additional images can be presented side by side with a fused image or with the other individual images; however, displaying all such information in a single fused image, as with fusing two images as discussed above in connection with fusing anatomical and functional image, may provide additional useful information.

Unfortunately, conventional image fusion techniques are not well-suited to combine more than two such images in a clinically useful manner; in most of the practical cases, it is very difficult to achieve satisfactory visual clearness by simply overlaying or blending three different color-schemes based on variable hues and intensities. For example, common dual-modality systems achieve a reasonable fused image by blending a particular color-scheme image with another grayscale image. However, trying to add additional semi-transparent overlay of a second color-scheme image (as the third information layer) leads to the creation of new undesired hues which in many cases confuse the observer and cannot improve the clinical diagnostics.

As a consequence, today, in those cases, when more than two clinical information types are relevant, the common solution is simply to show different images side by side on the same display. In order to facilitate the comparison between images, additional tools are then provided such as enabling simultaneous spatial indicators by a reference grid, mouse click, "lock" images together, copy ROIs, etc. Nevertheless, in many cases it is still more difficult and time consuming to compare different information types on different images than on a single fused image.

Another technique has been to add spatially distributed geometrical structures such as arrows and curves to a fused image. Such structures have been represented as vectorial data such as flow patterns, magnetic fields, gradients, or other properties such as contouring of equal-intensity patterns. Some of these techniques are known as 'quiver plot', 'velocity plot', 'curl plot', 'contouring plot' and 'arrow plot'. Unfortunately, such techniques are usually insufficient for a clear visualization of spatially distributed scalar data. It is also possible to overlay different information layers in an image which creates the illusion of three-dimensional space, for example, where different layers have different depths. However, such forms are usually difficult to perceive by the observer and the adjustments and optimization are complicated as well as the displaying apparatus.

Aspects of the present application address the above-referenced matters and others.

According to one aspect, a method includes fusing at least three images together into a single fused image, wherein at least one of the three images includes a binary-pattern representation image.

According to another aspect, a system includes an image processing system that combines an anatomical image, a functional image and a binary-pattern representation image into a single image.

According to another aspect, a computer readable storage medium encoded with instructions which, when executed by a processor of a computer, cause the processor to: combine an anatomical image, a functional image, and a binary-pattern representation of a different functional image into a single image such that the anatomical image and the functional image are visible in interspaces between binary points of the binary-pattern representation of the functional image.

The invention may take form in various components and arrangements of components, and in various steps and arrangements of steps. The drawings are only for purposes of illustrating the preferred embodiments and are not to be construed as limiting the invention.

Figure 1:
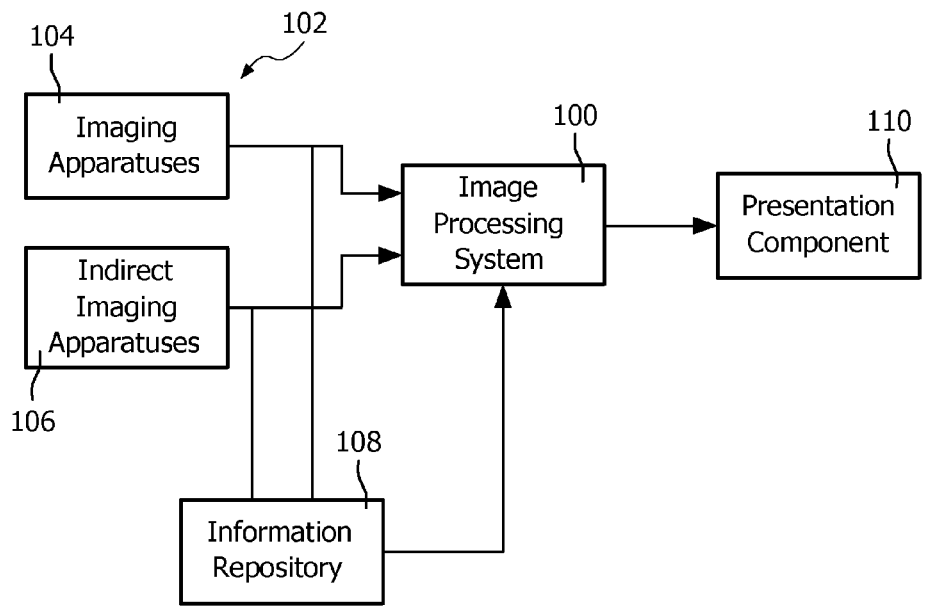
FIG. 1 illustrates an imaging processing system in connection with one or more information systems.

FIG. 1 illustrates an image processing system 100 in connection with one or more information systems 102. In the illustrated embodiment, the information systems 102 include one or more imaging apparatuses 104 such as a PET, CT, SPECT, X-ray, MRI, US, magnetic particle imaging (MPI), photo-acoustic, optical, infrared, etc. imaging apparatus, a PET-CT, SPECT-CT, PET-MRI, etc. dual-modality imaging apparatus and/or other imaging apparatus, and/or one or more indirect-imaging apparatuses 106 such as an magnetoencephalography (MEG), electroencephalography (EEG), and/or other indirect-imaging apparatus.

The systems 102 also include one more information repositories 108 (e.g., a database, a server, memory of a computer, a PACS system, a RIS system, a HIS system, etc.) that may store information corresponding to one or more of the apparatuses 104 and/or 106 and/or other information. It is to be understood that the above apparatuses are only examples of suitable apparatus and that other apparatuses are also contemplated herein. Furthermore, in another embodiment, one or more of the apparatuses 104 or 106 and/or the repositories 108 may be omitted. As such, the image processing system 100 may obtain information from one of an apparatus 104 or 106 or an information repository 108, or a combination thereof.

The image processing system 100 processes information from one or more of the apparatuses 104 and/or 106 and/or the repositories 108. As described in greater detail below, in one embodiment, the image processing system 100 is configured to combine such information, for example, register and fuse at least three different data types of information such as at least one anatomical image, at least one functional image (e.g., images indicative of metabolism, blood flow, regional chemical composition, absorption, etc.), and at least one binary-pattern representation of at least one functional image into a single image, such as a clinical useful and/or diagnostic image. Where more than one image is represented via a binary-pattern representation, different types of binary-patterns can be used with the different images. The various images can be from the same and/or different modalities.

A presentation component 110 such as a display, monitor, or the like can be used to present the fused output image of the image processing system 100. Additionally or alternatively, the presentation component 110 can present the individual anatomical image, functional image, and/or binary-pattern representation image. In one embodiment, one or more of these images may be presented through a graphical user interface, such as an interactive interface including one or more image manipulation tools.

It is to be appreciated that the image processing system 100 may be or may not be part of a computer, an imaging system, and/or other system local or remote to the one or more of the apparatuses 104 and/or 106 and/or the repositories 108. It is also to be appreciated that the image processing system 100 may include one or more processors that execute one or more computer readable instructions embedded and/or encoded on computer readable storage medium, or physical computer memory. In one embodiment, the one or more computer readable instructions, which, when executed by one or more of the one or more processors, cause the imaging processing system 100 to fuse such information as noted above.

Figure 2:
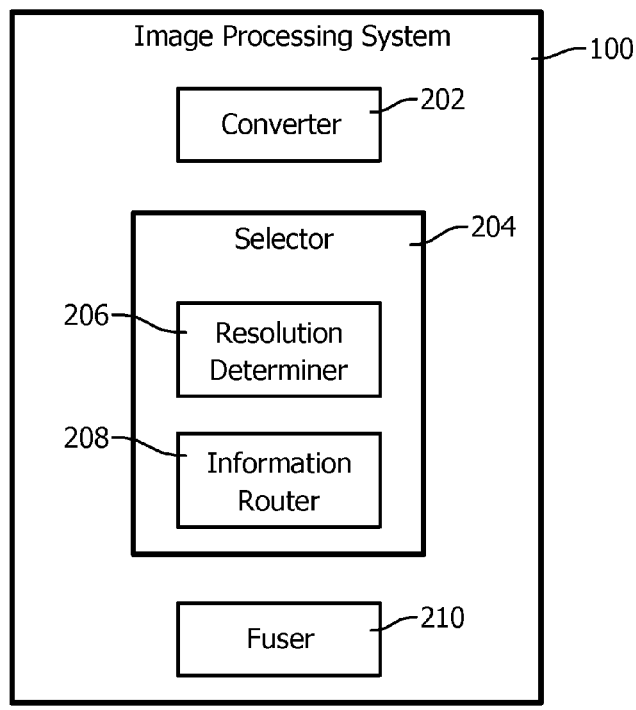
FIG. 2 illustrates a non-limiting example of the imaging processing system of FIG. 1.

FIG. 2 illustrate an example of the image processing system 100. In this embodiment, the image processing system 100 is configured to fuse an anatomical image, a functional image, and a binary-pattern representation of a different functional image into a single image. In other embodiments, other combinations of images are combined, including combinations of more than three images and less then three images. One or more of the images may be provided by the same or different modalities. Furthermore, in other embodiments, more than three images are combined.

The illustrated image processing system 100 includes an information converter 202 that converts at least one of two different functional images into a binary-pattern representation image. An information selector 204 selects the functional image to be converted. The illustrated information selector 204 includes a resolution determiner 206 that determines a resolution of the two functional images and an information router 208 that routes the functional information with the lower resolution to the information converter 202. Lower resolution image morphologies can be well-suited to be represented by the binary-pattern representation, wherein the binary points and their interspaces can be perceived by the observer and the local point densities are proportional to the original data intensities or values.

The illustrated image processing system 100 also includes an image fuser 210, which is configured to fuse the anatomical image, the functional image, and the binary-pattern representation image. In one instance, the anatomical image information is formatted in a grayscale scheme, the functional image information is formatted in a color scheme, and the binary representation image is combined therewith so that the anatomical and functional images are visible in the interspaces between the binary points of the binary-pattern representation. This may allow for producing a fused image in which both the binary pattern and the interspaces between them can be well perceived in the pattern. Therefore, this may allow a user to visually recognize on the combined image essential features of each one of the three information types and to inspect their mutual relations.

An example binary-pattern representation includes, but is not limited to, a coarse-grained representation such as a coarse-grained dithering. Suitable dithering includes juxtaposing pixels of two different visualization appearances (e.g. opaque color and transparent) in specific patterns to create the illusion of an intermediate information/image intensity between the two extremities of fully opaque and fully transparent.

With one approach, each pixel is of a fixed displayed size (e.g., independent of zoom) and can only be opaque or transparent. Intermediate information/image intensity is simulated by ensuring that on average in a region the desired portion of pixels is opaque. The more opaque pixels printed in a region, the higher the mean density, and hence the higher the corresponding image intensity. The varying intensity regions within the image are converted to opaque and transparent patterns by distributing the opaque dots/pixels according to the original intensity of the spatial region. This creates the illusion of different intensities.

Another suitable dithering may be similar to half-toning (e.g., as used with printers) where dots are placed in a regular grid format at fixed predetermined intervals and the size of the dots is an analog (i.e. a continuous) value that changes with the desired intensity appearance, and where larger dots are used for higher intensities and smaller ones for lower intensities.

Various algorithms can be employed to perform dithering. For example, a very common method is the Floyd-Steinberg dithering algorithm. A strength of this algorithm is that it minimizes visual artifacts through an error-diffusion process; error-diffusion algorithms typically produce images that more closely represent the original image.

Figure 3:
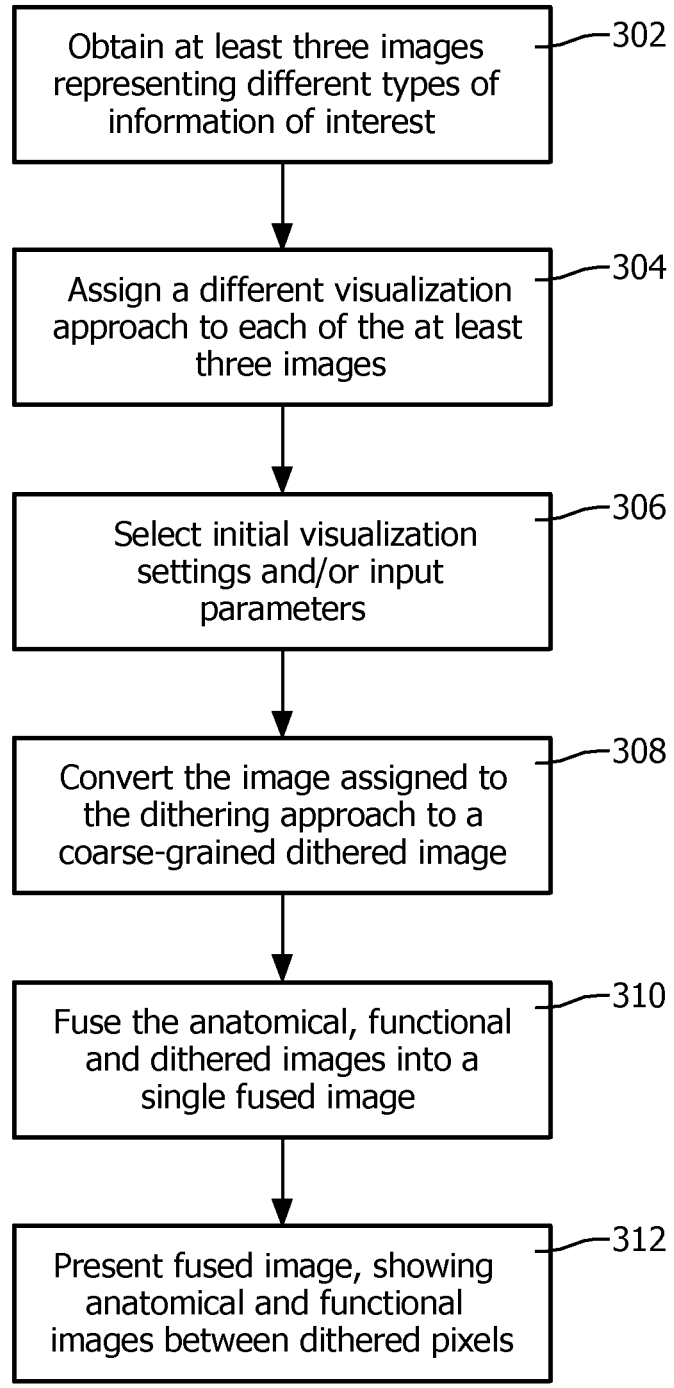
FIG. 3 illustrates an example method for combining an anatomical image, a functional image, and a binary-pattern representation of a different functional image into a single fused image.

FIG. 3 illustrates an example method in which three types of images are combined. For sake of brevity and clarity, the following describes an embodiment in which an anatomical and two functional images are combined. In addition, the order of the following acts is provided for explanatory purposes and is not limiting. As such, one or more of the acts may be performed in a different order. Moreover, one or more of the acts can be omitted and/or one or more additional acts can be included to be performed.

At 302, at least three images representing different types of information of interest are obtained. Such images can be obtained from one or more of apparatuses 104 and/or 106 and/or one or more of the repositories 108. The sets of information may or may not be processed. Examples of such processing includes, but is not limited to, corrections, spatial registration, and/or data re-scaling, and/or other processing predetermined to be performed before fusing the images.

At 304, a different visualization approach is assigned to each of the three images. This can be done automatically, semi-automatically or manually. Examples of suitable viewing approaches include, but do not include grayscale, transparent color-scheme, dithering, and/or other approaches. As discussed herein, the image assigned to dithering can be the functional image with the lowest spatial resolution.

At 306, initial visualization settings and/or input parameters are selected. These can be selected automatically, semi-automatically or manually, and may ensure optimal and/or predetermined desired viewing results. By way of example, several parameters can be adjusted to control and optimize the dithering visualization outcome. For example, in one instance the size of the displayed dithering points is set small enough to enable high density dynamic range, but not too small so they can still be observed as separate points on a colored background. The desired point density dynamic range and any density thresholds for limiting the visualized intensities can be set as well.

In one non-limiting instance, the dithering algorithm employed works on a pre-defined image value range, such as values from zero (0) to one (1). In this instance, the original image values may be rescaled to fit the desired new value range. In addition, too high or low values may be clipped to define thresholds.

Note that the array/matrix corresponding to the fused-image region that is selected for display, can have different mathematical size than the actual matrix size of the relevant screen region. In that case, the array of the relevant fused-image region may be mathematically resized or rescaled, to enable the correct dithering point size and density. This may be useful with applications in which the algorithm treats a dithering point as one pixel in the calculated array that will be displayed later on.

Any defined colors are assigned to the dithering points, for example, in accordance to the original data values. The colors may be noticeably different than the colors of the semi-transparent color-scheme of the other two layers that will be shown in the interspaces.

At 308, the image assigned to dithering is converted to a binary pattern representation based on the settings and/or patterns. As described herein, one such representation includes a coarse-grained dithering. In another embodiment, the dithering points may be represented with semi-transparent colors, in a similar way to the two other information layers. Furthermore, several different dithering and halftoning techniques can be combined together, for example, for viewing on high-definition screens.

At 310, the three images, including the anatomical image, the non-converted functional image and the binary-pattern representation image, are fused to generate a fused image. By way of example, in one instance, this includes fusing the binary-pattern representation image with a grayscale scheme for the anatomical image and a color scheme for the functional image that was not converted.

The three images can be concurrently fused, or two of the images (e.g., the anatomical and the functional image, or another combination of images) can be fused to generate an intermediate fused image, and then the intermediate fused image can be fused with the other image (e.g., the binary-pattern representation image, or other image) to generate a fused image of the three images.

As discussed above, the images are fused so that the grayscale anatomical image and the color functional images can be viewed in the interspaces between the binary points of the binary-pattern representation image, which may allow a user to visually recognize, via the fused image, essential features of each one of the three information types and to inspect their mutual relations.

At 312, the fused image (and/or one or more of the original and/or converted images) is displayed. The image can be displayed via an interactive interface that produces interactive tools that allow a user to change visualization settings and/or to present additional clinical information related to the displayed image. For example, one interactive interface may allow the user to change zoom, point densities, colors, etc. and/or to obtain additional clinical information.

After such changes the dithering process may be calculated again to re-optimize the viewing according to the new conditions. As noted herein, a change in zoom may not affect the display size of the dithered pixels that are set to a fixed size. In addition, a change in zoom may affect a re-optimization of the density dynamic range of the dithered pixels. The interactive interface may also allow for selecting a point or a region on the display to get any corresponding value, graphs, tables or other detailed analyses of related clinical information.

It is to be appreciated that the approaches described herein can be used to view axial and/or non-axial images such as multiplanar reformation (MPR), oblique slices, surface visualization, maximum-intensity-projections (MIP), and/or other images.

The above described acts may be implemented by way of computer readable instructions, which, when executed by a computer processor(s), causes the processor(s) to carry out the acts described herein. In such a case, the instructions are stored in a computer readable storage medium such as memory associated with and/or otherwise accessible to the relevant computer.

The invention has been described with reference to the preferred embodiments. Modifications and alterations may occur to others upon reading and understanding the preceding detailed description. It is intended that the invention be constructed as including all such modifications and alterations insofar as they come within the scope of the appended claims or the equivalents thereof.

What is claimed is:

1. A method, comprising:
    fusing with a computer processor at least three images of a subject together into a single fused image of the subject, each image representing different information of the subject, wherein at least one of the at least three images is an image with the different information of the subject represented by a binary-pattern, and the fused image includes the different information from each image including the binary-pattern of the different information of the subject represented in the at least one of the at least three images; and
    wherein the binary-pattern includes pixels that represent the different information of the subject with pixel visualizations of transparent and non-transparent, wherein a pattern is an effect of the transparent and non-transparent pixel visualizations;
    wherein the at least three images includes an anatomical image of the subject, a first functional image of the subject, and a second functional image of the subject;
    wherein the different information of the anatomical image is represented using a semi-transparent grayscale scheme;
    wherein the different information of the second functional image is represented using a semi-transparent color scheme.

2. The method of claim 1, wherein the binary-pattern includes dithering with juxtaposed pixels of transparent and non-transparent visualizations.

3. The method of claim 1, further comprising:
converting a first functional image of the at least three images into the image with the different information of the subject represented by a binary-pattern which uses a dithered representation.

4. The method of claim 3, further comprising:
identifying as the first functional image an image from a plurality of functional images of the at least three images with a lowest image resolution.

5. The method of claim 1, further comprising:
representing the non-transparent pixel visualizations of the binary-pattern representation with a single opaque color.

6. The method of claim 5, wherein the binary-pattern representation image includes one or more pixels represented with transparent pixel values, wherein the representation of the anatomical image and the representation of the functional image are visible in the one or more pixels represented with transparent pixel visualizations of the image with the different information of the subject represented by a binary-pattern in the single fused image of the subject.

7. The method of claim 1, wherein the non-transparent pixel visualizations include opaque dots in a regular grid format at fixed predetermined intervals and a size of the opaque dots represents the different information in a spatial region from the first functional image in the single fused image.

8. The method of claim 7, further comprising:
receiving, via an interactive interface, an input indicative of a zoom factor for the fused image as presented; and
scaling the different information fused into the fused image corresponding to non-binary-pattern representation images.

9. The method of claim 8, further comprising:
maintaining a size of the binary-pattern independent of scaling the fused image.

10. The method of claim 1, further comprising:
receiving an input indicative of at least one of: one or more visualization settings for the single fused image, or parameters for the fused image; and
presenting the single fused image based on the received one or more visualization settings and/or parameters.

11. The method of claim 1, wherein each non-transparent pixel visualization is of a fixed display size independent of zoom, and the different information is represented by a density of the non-transparent pixel visualizations in a region of the first functional image within the single fused image.

12. A system, comprising:
an image processing system including a computer processor that combines an anatomical image, a first functional image which includes functional information represented as a binary-pattern, and a second functional image into a single image; and
wherein the functional information of the first functional image represented as the binary-pattern includes transparent and non-transparent pixel visualizations, wherein a pattern is an effect of the transparent and non-transparent pixel visualizations;
wherein the anatomical image is represented using a semi-transparent grayscale scheme and the second functional image is represented using a semi-transparent color scheme.

13. The system of claim 12, wherein the binary-pattern represented in the first functional image includes dithering with the transparent and non-transparent pixel visualizations and the information in the first functional image is different from information in the second functional image.

14. The system of claim 12, further comprising:
an information selector including a computer processor that selects the first functional image from a plurality of functional images based on a lowest resolution; and
an information converter including a computer processor that converts the functional information of the selected first functional image into the binary-pattern in the first functional image.

15. The system of claim 14, wherein the information selector further includes:
a resolution determiner that determines a resolution of each of the plurality of functional images; and
an information router that routes the functional information of the first functional image with the lowest resolution to the information converter.

16. The system of claim 12, wherein the grayscale of the anatomical image and the color of the second functional image are visible in the one or more pixels represented with transparent pixel visualizations of the binary-pattern representation image of the first functional image combined in the single image.

17. The system of claim 16, wherein the non-transparent pixel visualizations are represented by one color and include one or more pixels.

18. A non-transitory computer readable storage medium encoded with computer executable instructions, which, when executed by a processor of a computer, cause the processor to:
combine an anatomical image, a first functional image with a binary-pattern representation of the functional information that includes transparent pixel visualizations, and a second functional image with different functional information from that of the first functional image into a single image such that the anatomical image and the second functional image are visible in the transparent pixel visualizations, wherein the binary-pattern representation of the functional information includes pixel visualizations represented as transparent regions and non-transparent regions, and each region includes one or more pixels, wherein a a pattern is an effect of the transparent regions and the non-transparent regions.

19. The non-transitory computer readable storage medium encoded with computer executable instructions according to claim 18, wherein the non-transparent regions are represented by one color, wherein the different functional information of the second functional image is represented with a semi-transparent color scheme, wherein the anatomical image is represented with a semi-transparent grayscale scheme.

* * * * *